(12) United States Patent
Ohara

(10) Patent No.: US 12,731,982 B2
(45) Date of Patent: Sep. 8, 2026

(54) TRANSIENT VOLTAGE ABSORPTION ELEMENT

(71) Applicant: Murata Manufacturing Co., Ltd., Nagaokakyo (JP)

(72) Inventor: Tatsuya Ohara, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 218 days.

(21) Appl. No.: 18/624,496

(22) Filed: Apr. 2, 2024

(65) Prior Publication Data

US 2024/0250523 A1 Jul. 25, 2024

Related U.S. Application Data

(63) Continuation of application No. PCT/JP2022/036484, filed on Sep. 29, 2022.

(30) Foreign Application Priority Data

Oct. 4, 2021 (JP) ................................ 2021-163296

(51) Int. Cl.
*H02H 9/00* (2006.01)
*H02H 9/04* (2006.01)

(52) U.S. Cl.
CPC .............. *H02H 9/005* (2013.01); *H02H 9/04* (2013.01)

(58) Field of Classification Search
CPC ........... H02H 9/005; H02H 9/04; H10D 84/00
(Continued)

(56) References Cited

U.S. PATENT DOCUMENTS 6,212,259 B1 * 4/2001 Kiko ........................ H03G 7/00 379/32.01
9,246,328 B2 * 1/2016 Wang .................. H03H 7/1708
(Continued)

FOREIGN PATENT DOCUMENTS

EP 0393333 A2 * 10/1990 ............ H02H 9/042
JP S4727614 A 10/1972
(Continued)

OTHER PUBLICATIONS

International Search Report in PCT/JP2022/036484, mailed Dec. 13, 2022, 4 pages.

*Primary Examiner* — Dharti H Patel
(74) *Attorney, Agent, or Firm* — ArentFox Schiff LLP

(57) ABSTRACT

A transient voltage absorption element is provided that is connected to a signal line in series and to a shunt between the signal line and a reference potential. The transient voltage absorption element includes a base material, a first input and output terminal in the base material and connected to the signal line, a second input and output terminal in the base material and connected to the signal line, a reference potential connection terminal in the base material and connected to the reference potential, an internal signal line that is electrically connected between the first and second input and output terminals, and a surge absorption element connected between the internal signal line and the reference potential connection terminal. Magnitude of an impedance of a parasitic capacitance component, in a frequency band of a signal propagating through the internal signal line is smaller than a resistance component of the signal line.

20 Claims, 12 Drawing Sheets

(58) Field of Classification Search
USPC .......................................................... 361/118
See application file for complete search history.

(56) References Cited

U.S. PATENT DOCUMENTS

| | | | | |
|---|---|---|---|---|
| 10,944,602 | B1 * | 3/2021 | Rogers | H04L 25/03146 |
| 12,040,702 | B2 * | 7/2024 | Giuliano | H02M 3/33576 |
| 2005/0162790 | A1 | 7/2005 | Yoshinaga | |
| 2011/0058299 | A1 * | 3/2011 | Simi | H02H 9/042 361/111 |
| 2011/0309466 | A1 | 12/2011 | Nanba | |
| 2013/0168837 | A1 | 7/2013 | Kato et al. | |
| 2014/0198417 | A1 * | 7/2014 | Wang | H02H 9/045 361/56 |
| 2015/0002968 | A1 * | 1/2015 | Wang | H03H 7/0107 361/56 |
| 2015/0364462 | A1 | 12/2015 | Nakaiso et al. | |
| 2017/0077697 | A1 * | 3/2017 | Girard | H02H 9/04 |
| 2017/0373492 | A1 * | 12/2017 | Ueki | H02H 9/044 |
| 2019/0123554 | A1 * | 4/2019 | Nakaiso | H01F 17/0013 |
| 2020/0014294 | A1 * | 1/2020 | Song | H02M 3/158 |
| 2020/0395353 | A1 * | 12/2020 | Shimoichi | H10D 86/85 |
| 2022/0069564 | A1 * | 3/2022 | Grey | H02H 3/22 |
| 2024/0039275 | A1 * | 2/2024 | Ohara | H02H 9/007 |
| 2024/0204512 | A1 * | 6/2024 | Vudugula | H02M 1/34 |
| 2024/0250523 | A1 * | 7/2024 | Ohara | H02H 9/005 |
| 2025/0087995 | A1 * | 3/2025 | Bloom | H02H 9/04 |

FOREIGN PATENT DOCUMENTS

| | | | | |
|---|---|---|---|---|
| JP | 2005217043 | A | 8/2005 | |
| JP | 2008244406 | A | 10/2008 | |
| JP | 2009033462 | A | 2/2009 | |
| JP | 2012009481 | A | 1/2012 | |
| JP | 2020205342 | A | 12/2020 | |
| WO | 2012023394 | A1 | 2/2012 | |
| WO | 2014132938 | A1 | 9/2014 | |
| WO | WO-2015183399 | A1 * | 12/2015 | H04B 3/00 |
| WO | 2017159282 | A1 | 9/2017 | |
| WO | WO-2022196642 | A1 * | 9/2022 | H02H 9/04 |

* cited by examiner

Prior Art

TRANSIENT VOLTAGE ABSORPTION ELEMENT

CROSS REFERENCE TO RELATED APPLICATIONS

This application is a continuation of International Application No. PCT/JP2022/036484, filed Sep. 29, 2022, which claims priority to Japanese Patent Application No. 2021-163296, filed Oct. 4, 2021, the entire contents of each of which are hereby incorporated by reference in their entirety.

TECHNICAL FIELD

The present disclosure relates to a transient voltage absorption element that absorbs a transient abnormal voltage due to electrostatic discharge (ESD) or the like, or a surge such as a lightning surge or an opening and closing surge.

BACKGROUND

Japanese Patent Unexamined Publication No. 47-27614 bulletin (hereinafter "Patent Literature 1") discloses a repeater surge protection circuit that protects an amplifier of a repeater from destruction of a high voltage surge or a high current surge generated by a cable failure or the like, and reduces occurrence of group delay distortion.

FIG. 12 in Patent Literature 1 illustrates a circuit diagram of the repeater surge protection circuit. As shown, the repeater surge protection circuit includes input and output terminals (9 and 10) and (11 and 12), surge absorption elements 17 and 18, a DC cut-off capacitor 19, and T-type 4-terminal circuits 20 and 21.

In the repeater surge protection circuit shown in FIG. 12, since resistance elements within the T-type 4 terminal circuits 20 and 21 are provided to act in a low frequency band including DC, an insertion loss of a transmission line increases in all frequency bands. In addition, since capacitors within the T-type 4-terminal circuits 20 and 21 are incorporated by being implemented on a circuit board, a resistance component R is generated in a wiring or a capacitor to which the capacitors are connected. Since the resistance component R is connected to the transmission line in series, the insertion loss is large even in a used frequency band. In addition, the total number of components is large, and thus, an implementation area inevitably increases.

SUMMARY OF THE INVENTION

In view of the foregoing, it is an object of the present invention to provide a transient voltage absorption element that reduces an insertion loss in a high frequency band which is a used frequency band while including a resistance component in series with a transmission line.

According to an exemplary aspect, a transient voltage absorption element is provided that is connected to a signal line in series and is connected to a shunt between the signal line and a reference potential. The transient voltage absorption element includes a base material, a first input and output terminal in the base material and connected to the signal line, a second input and output terminal in the base material and connected to the signal line, a reference potential connection terminal in the base material and connected to the reference potential, an internal signal line inside the base material and electrically connected between the first input and output terminal and the second input and output terminal, and a surge absorption element connected between the internal signal line and the reference potential connection terminal. A magnitude of an impedance of a parasitic capacitance component, in a frequency band of a signal propagating through the internal signal line, which is generated between the first input and output terminal and the second input and output terminal, is smaller than a resistance component of the internal signal line.

According to the exemplary aspects of the present disclosure, a transient voltage absorption element is provided that has a low insertion loss in a high frequency band that is a used frequency band while including a resistance component in series with a transmission line.

BRIEF DESCRIPTION OF DRAWINGS

FIG. 5(A) is a diagram showing a circuit including a first resistance component R1 and a first parasitic capacitance component Cp1 of the transient voltage absorption element according to the first exemplary embodiment, and FIG. 5(B) is an equivalent circuit diagram thereof.

FIG. 9(A) is a diagram showing a circuit including a first resistance component R1 and a first parasitic capacitance component Cp1 of the transient voltage absorption element according to the second exemplary embodiment, and FIG. 9(B) is an equivalent circuit diagram thereof.

DETAILED DESCRIPTION

Hereinafter, a plurality of exemplary aspects of the present invention will be shown and described with some specific examples with reference to the drawings. It is noted that in each figure, the same parts are designated by the same reference signs. In consideration of the description of the main points or ease of understanding, the embodiment is divided into a plurality of embodiments for convenience of description, but partial replacement or combination of configurations shown in different embodiments is contemplated as should be appreciated to those skilled in the art. In second and subsequent embodiments, description of matters common to a first embodiment will be omitted, and only different points will be described. In particular, similar actions and effects obtained by similar configurations will not be sequentially described for each embodiment.

First Exemplary Embodiment

Figure 1:
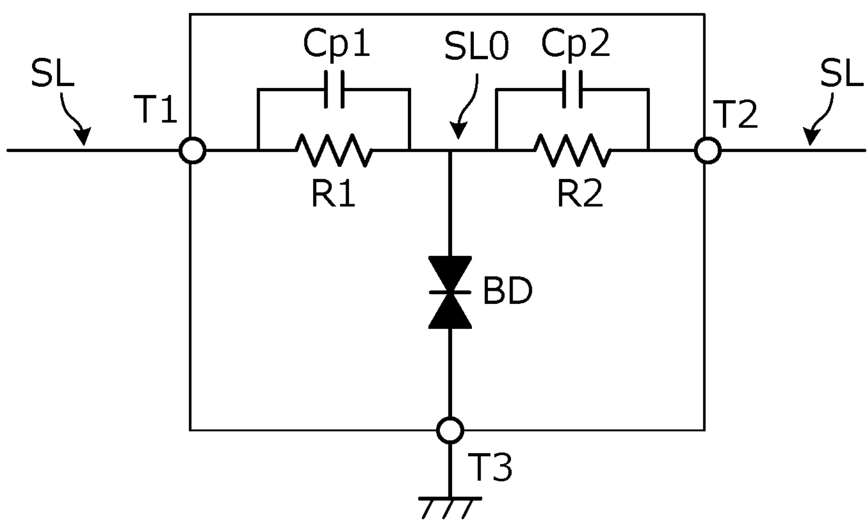
FIG. 1 is a circuit diagram of a transient voltage absorption element 101A according to a first exemplary embodiment.

FIG. 1 is a circuit diagram of a transient voltage absorption element 101A according to a first exemplary embodiment. According to the exemplary aspect, the transient voltage absorption element 101A is a transient voltage absorption element connected to a signal line SL in series and is connected to a shunt between the signal line SL and a reference potential.

In addition, the transient voltage absorption element 101A includes a first input and output terminal T1 (e.g., a first I/O terminal) connected to the signal line SL, a second input and output terminal T2 (e.g., a second I/O terminal) connected to the signal line SL, and a reference potential connection terminal T3 connected to the reference potential.

An internal signal line SL0 is provided between the first input and output terminal T1 and the second input and output terminal T2. The internal signal line SL0 includes a first resistance component R1 and a second resistance component R2. Moreover, a diode BD is connected between the internal signal line SL0 and the reference potential connection terminal T3.

A first parasitic capacitance component Cp1 and a second parasitic capacitance component Cp2 is present between the first input and output terminal T1 and the second input and output terminal T2.

The first resistance component R1 and the second resistance component R2 are configured as current limiting resistors that limit a low-frequency (mainly direct current) current. Alternatively, the resistor can be configured to function as a termination resistor for impedance matching.

In a frequency band of a signal propagating through the internal signal line SL0, the first parasitic capacitance component Cp1 has a lower impedance than the first resistance component R1, and the second parasitic capacitance component Cp2 has a lower impedance than the second resistance component R2. That is, an impedance ABS (1/jωCp1) with the first parasitic capacitance component Cp1 is smaller than the first resistance component R1, and an impedance ABS (1/jωCp2) with the second parasitic capacitance component Cp2 is smaller than the second resistance component R2. For purposes of this disclosure, it is noted that the designation "ABS( )" represents an absolute value.

Thus, in the transient voltage absorption element 101A, the presence of the first resistance component R1 and the second resistance component R2 can be ignored in a high frequency band (for example, 10 GHz band) that is a used frequency band, and a low insertion loss can be realized.

Figure 2:
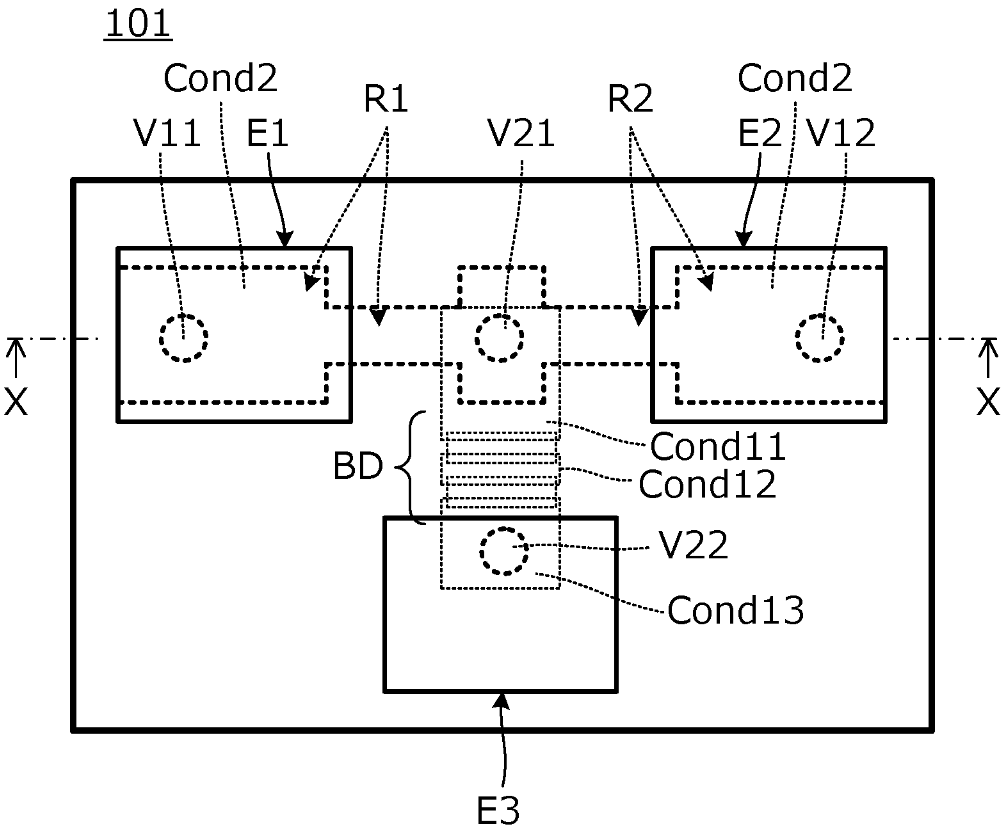
FIG. 2 is a plan view of the transient voltage absorption element 101A.

Next, an example of a structure of the transient voltage absorption element 101A will be described. FIG. 2 is a plan view of the transient voltage absorption element 101A, and FIG. 3 is a sectional view taken along line X-X in FIG. 2.

Figure 3:
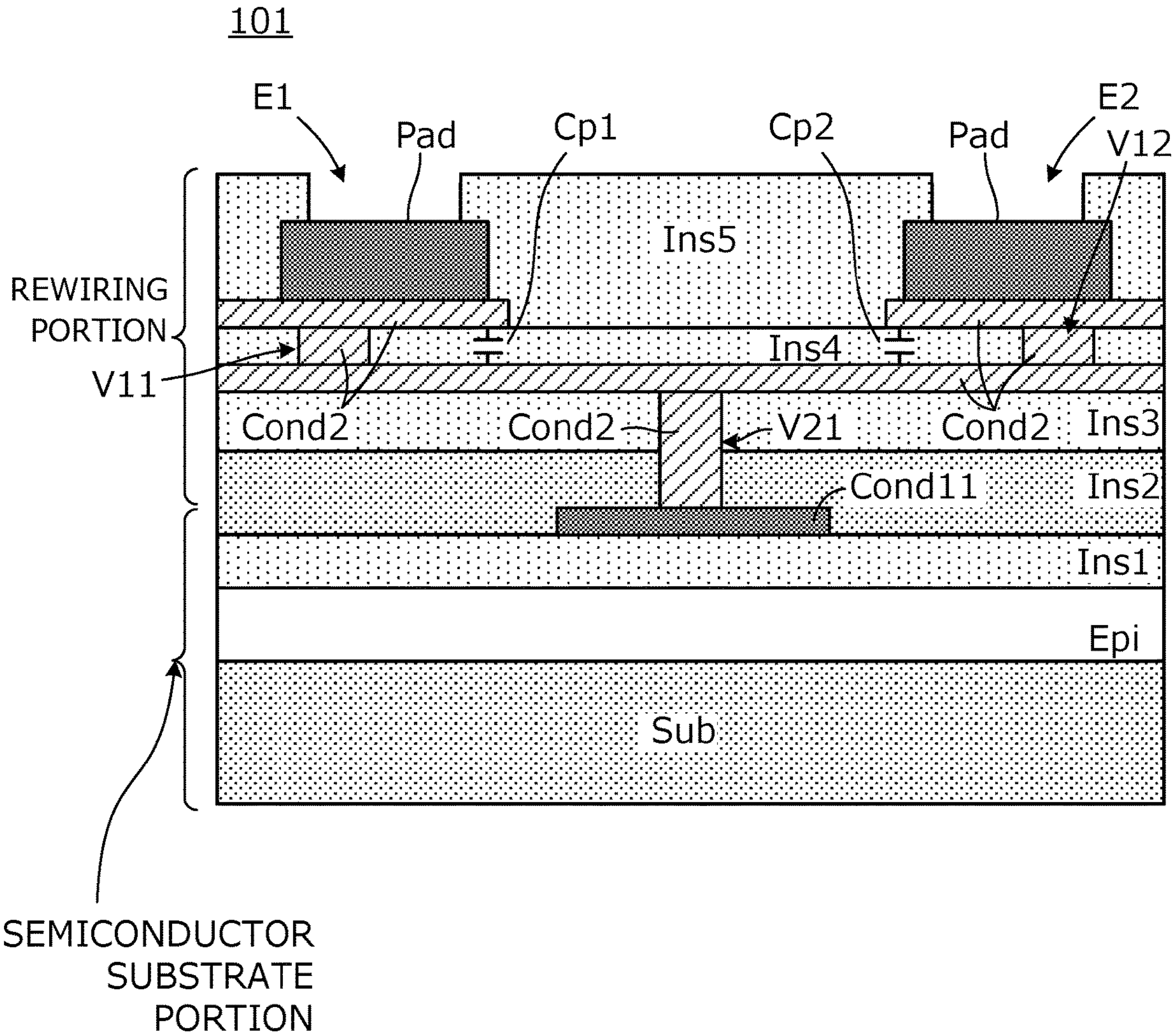
FIG. 3 is a sectional view taken along a X-X portion in FIG. 2.

As shown in FIG. 3, the transient voltage absorption element 101A includes a semiconductor substrate portion and a rewiring portion. The semiconductor substrate portion and the rewiring portion correspond to a "base material" according to the present disclosure.

According to an exemplary aspect, the semiconductor substrate portion includes a semiconductor substrate Sub, an epitaxial layer Epi, an insulator Ins1, and electrical conductors Cond11, Cond12, and Cond13. The semiconductor substrate Sub is, for example, a Si substrate, a GaAs substrate, or the like. A $SiO_2$ film may be used as a material of the insulator Ins1. For example, Al or Cu may be used as a material of the electrical conductors Cond11, Cond12, and Cond13.

The rewiring portion includes insulators Ins2, Ins3, Ins4, and Ins5, electrical conductors Cond2, and pads Pad.

According to an exemplary aspect, the insulator Ins2 is, for example, SiN, and the insulators Ins3, Ins4, and Ins5 are, for example, organic resins such as epoxy. For example, Cu may be used as a material of the electrical conductor Cond2. The pad Pad includes, for example, a plurality of layers of electrode forming electrical conductors. For example, the pad Pad may include an underlayer and a surface layer. In addition, an adhesion layer may be further included between the underlayer and the surface layer. Ni may be used as a material of the underlayer, Ti may be used as a material of the adhesion layer, and Au may be used as a material of the surface layer.

A first terminal electrode E1, a second terminal electrode E2, and a third terminal electrode E3 shown in FIG. 2 are pads Pad shown in FIG. 3. In addition, the electrical conductors Cond2 of lower layers of the rewiring portion form the first resistance component R1 and the second resistance component R2. That is, the electrical conductors Cond2 of the lower layers of the rewiring portion are wiring patterns of conductors having a predetermined resistivity. The electrical conductor Cond2 of an upper layer and the electrical conductor Cond2 of a lower layer are connected by via conductors V11 and V12. The electrical conductor Cond2 of the lower layer and the electrical conductor Cond11 of the semiconductor substrate portion are connected by a via conductor V21.

In such a structure, in order to increase resistance values of the first resistance component R1 and the second resistance component R2 shown in FIG. 1, a film thickness of the wiring pattern by the electrical conductor Cond2 is reduced and/or a line width of the wiring pattern is reduced. In addition, it is also effective to increase lengths of the via conductors V11 and V12 and to reduce diameters of the via conductors V11 and V12.

As shown in FIG. 2, the diode BD is formed between the electrical conductor Cond11 and the electrical conductor Cond13. The electrical conductor Cond3 and the third terminal electrode E3 are connected through a via conductor V22 and an electrical conductor.

An upper layer pattern and a lower layer pattern of the electrical conductor Cond2 forming the internal signal line SLO face each other via the insulator Ins4. The first parasitic capacitance component Cp1 is generated in a region where the upper layer pattern and the lower layer pattern face each other in a place forming the first resistance component R1. The second parasitic capacitance component Cp2 is generated in a region where the upper layer pattern and the lower layer pattern face each other in a place forming the second resistance component R2.

The first terminal electrode E1 shown in FIG. 2 corresponds to the first input and output terminal T1 shown in FIG. 1, the second terminal electrode E2 corresponds to the second input and output terminal T2, and the third terminal electrode E3 corresponds to the reference potential connection terminal T3.

Figure 4:
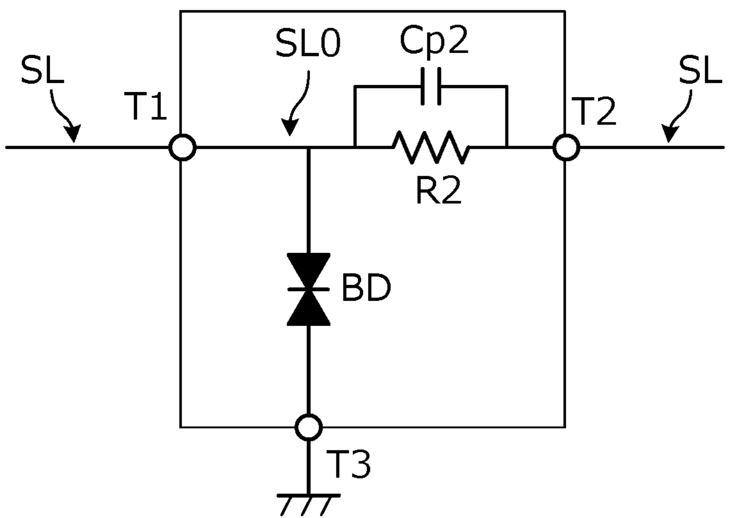
FIG. 4 is a circuit diagram of a transient voltage absorption element 101B according to the first exemplary embodiment.

FIG. 4 is a circuit diagram of another transient voltage absorption element 101B B according to the first embodiment. In the transient voltage absorption element 101A shown in FIG. 1, although an example in which the resistance component R1 is present at a preceding stage of a connection point of the diode BD with respect to the internal signal line SL0 and the resistance component R2 is present at a subsequent stage is shown, in the transient voltage absorption element 101B, the resistance component R2 is present only at a subsequent stage of the connection point of the diode BD with respect to the internal signal line SL0. According to an exemplary aspect, the resistance component R2 can be used as, for example, a termination resistor.

As described above, the exemplary aspects of the present disclosure can be similarly applied to a transient voltage absorption element in which the resistance component inserted into the internal signal line is provided only at the subsequent stage of the diode BD. Similarly, the exemplary aspects of the present disclosure can be similarly applied to a transient voltage absorption element in which the resistance component inserted into the internal signal line is provided only at the preceding stage of the diode BD.

Figures 5A, 5B:
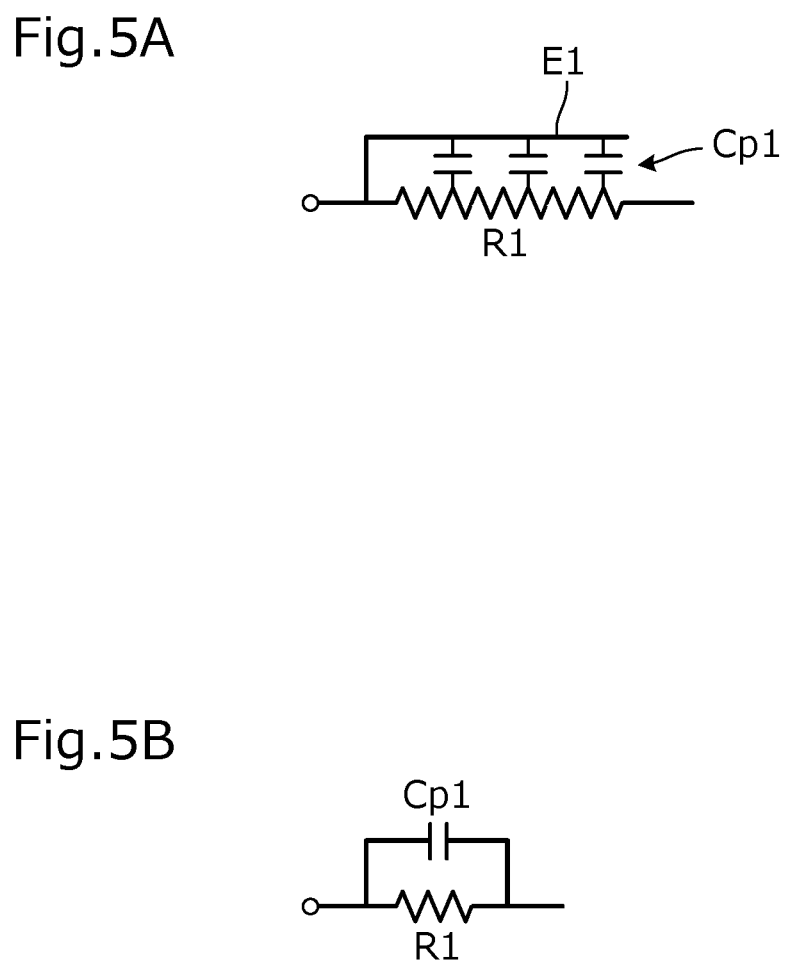

FIG. 5(A) is a diagram showing a circuit including the first resistance component R1 and the first parasitic capacitance component Cp1 of the transient voltage absorption element 101A, and FIG. 5(B) is an equivalent circuit diagram thereof.

Since the insulator Ins4 is a dielectric layer, a parasitic capacitance is formed between the electrical conductor Cond2 forming the first resistance component R1 and the first terminal electrode E1 as shown in FIG. 5(A). When this parasitic capacitance is equivalently represented by a single capacitor, as shown in FIG. 5(B), a circuit is obtained in which the first parasitic capacitance component Cp1 is connected in parallel to the first resistance component R1. The same applies to a relationship between the second resistance component R2 and the second parasitic capacitance component Cp2.

Figure 6:
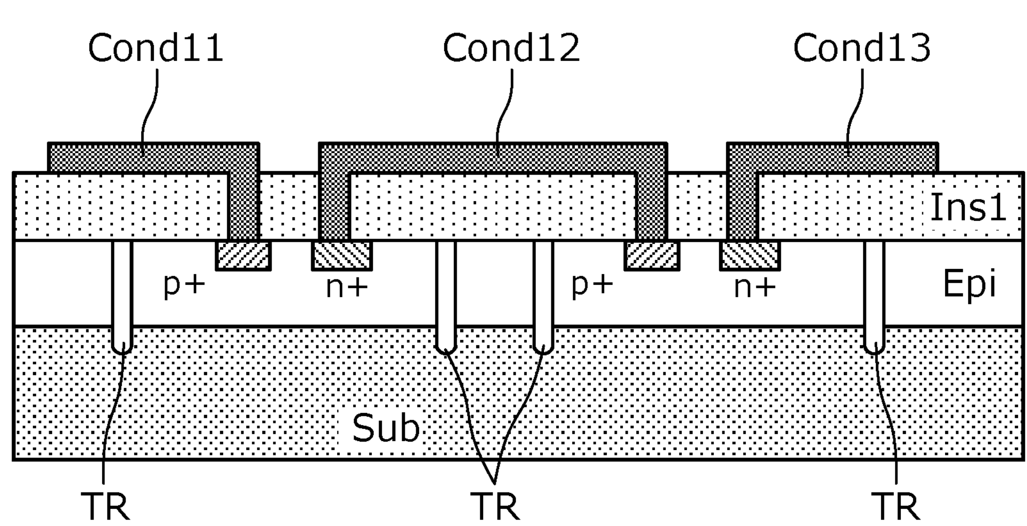
FIG. 6 is a sectional view of a diode BD.

FIG. 6 is a sectional view of a formation region of the diode BD. However, FIG. 6 shows the semiconductor substrate portion. The semiconductor substrate portion of the formation region of the diode BD includes the semiconductor substrate Sub, the epitaxial layer Epi, trenches TR, and the insulator Ins1.

The epitaxial layer Epi is, for example, an n-type epitaxial layer, and is formed on a surface of the semiconductor substrate Sub. p+ regions and n+ regions are formed on a surface layer of the epitaxial layer Epi. The insulator Ins1 is formed on a surface of the epitaxial layer Epi. The electrical conductors Cond11, Cond12, and Cond13 are formed from the surface of the epitaxial layer Epi to the p+ regions and the n+ regions. In addition, the trenches TR are formed from the insulator Ins1 to the semiconductor substrate Sub.

According to an exemplary aspect, the epitaxial layer Epi, the p+ region, and the n+ region form a diode. When the epitaxial layer Epi is the n-type epitaxial layer, a depletion layer is formed at an interface between the epitaxial layer Epi and the p+ regions. Moreover, the trench TR separates the diodes as further shown.

It is noted that a diode for surge absorption may be a Zener diode that conducts when a voltage exceeds the Zener voltage, in addition to a diode that conducts when the voltage exceeds a forward drop voltage.

Figure 7:
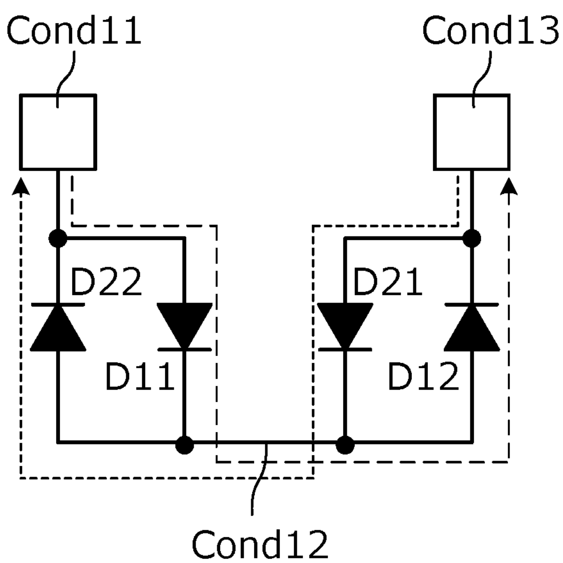
FIG. 7 is a circuit diagram of the diode BD.

FIG. 7 is a circuit diagram of the diode BD. A dashed-line arrow in FIG. 7 indicates a path and a direction of a current flowing through the diode BD. That is, when a positive potential is applied to the electrical conductor Cond11 in FIG. 7 and a voltage exceeding a forward voltage is applied to each diode, a current flows in a path of electrical conductor Cond11→diode D11→electrical conductor Cond12→diode D12→electrical conductor Cond13. In addition, when a positive potential is applied to the electrical conductor Cond13 in FIG. 7 and a voltage exceeding a forward voltage is applied to each diode, a current flows in a path of electrical conductor Cond13→diode D21→electrical conductor Cond12→diode D22→electrical conductor Cond11.

It is also noted that in the exemplary aspect as described above, although the resistance component includes an electrical conductor, the resistance component may include another resistor or a pattern of an electrical conductor.

Second Exemplary Embodiment

In a second exemplary embodiment, an example in which a parasitic capacitance is formed with a structure different from the example described in the first embodiment will be described.

Figure 8:
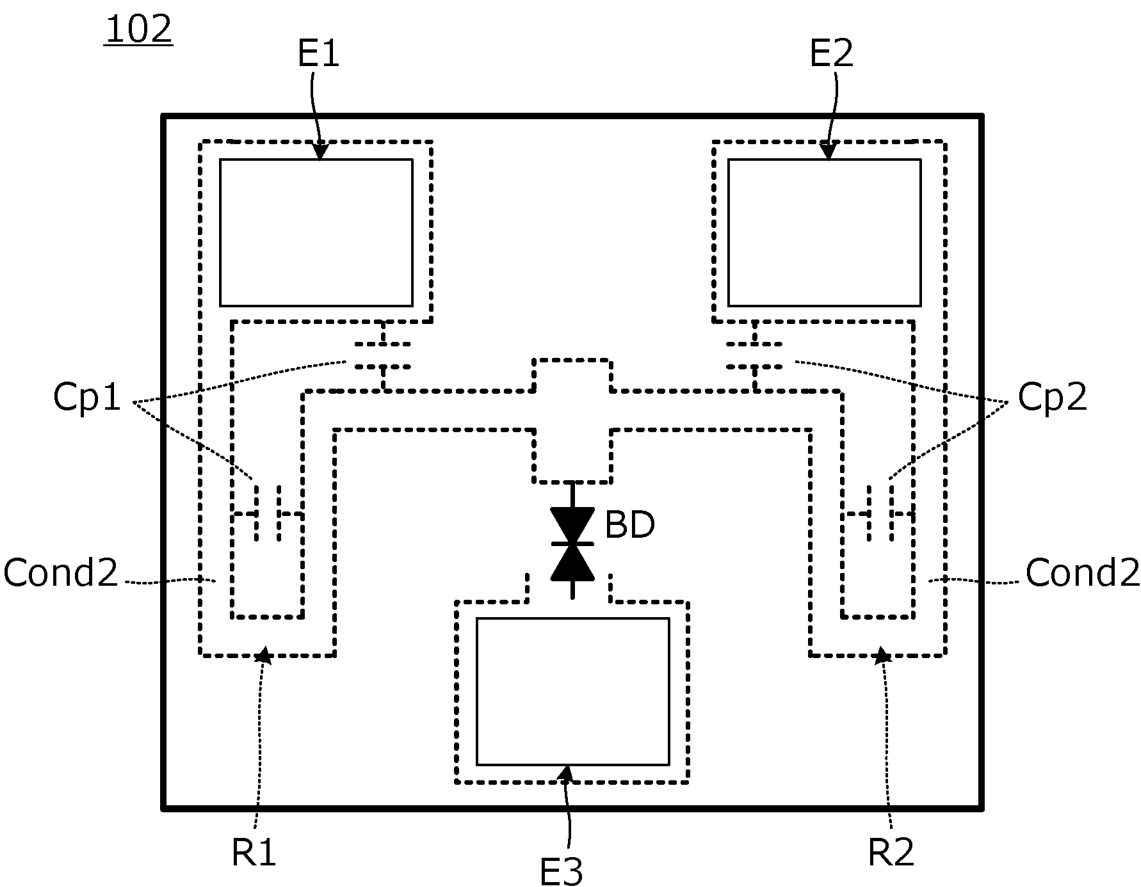
FIG. 8 is a plan view of a transient voltage absorption element 102 according to a second exemplary embodiment.

FIG. 8 is a plan view of a transient voltage absorption element 102 according to a second exemplary embodiment. A surface of the transient voltage absorption element 102 is covered with the insulator Ins5 similarly to the example shown in FIG. 3 in the first embodiment, and openings of the insulator Ins5 are the first terminal electrode E1, the second terminal electrode E2, and the third terminal electrode E3. The first terminal electrode E1, the second terminal electrode E2, and the third terminal electrode E3 include a part of an electrical conductor and pads Pad, similarly to the example shown in FIG. 3 in the first embodiment.

According to an exemplary aspect, the electrical conductors Cond2 form the first resistance component R1 and the second resistance component R2. The electrical conductor Cond2 forming the first resistance component R1 forms the first parasitic capacitance component Cp1 between the patterns. Similarly, the electrical conductor Cond2 forming the second resistance component R2 forms the second parasitic capacitance component Cp2 between the patterns.

As further shown, the diode BD is provided between the third terminal electrode E3 and a connection portion between one end of the first resistance component R1 and the second resistance component R2. However, in FIG. 8, this diode BD is represented by a circuit symbol. It should be appreciated that a basic structure of the diode BD can be similar to a basic structure of the diode BD shown in FIG. 2 according to an exemplary aspect.

Figures 9A, 9B:
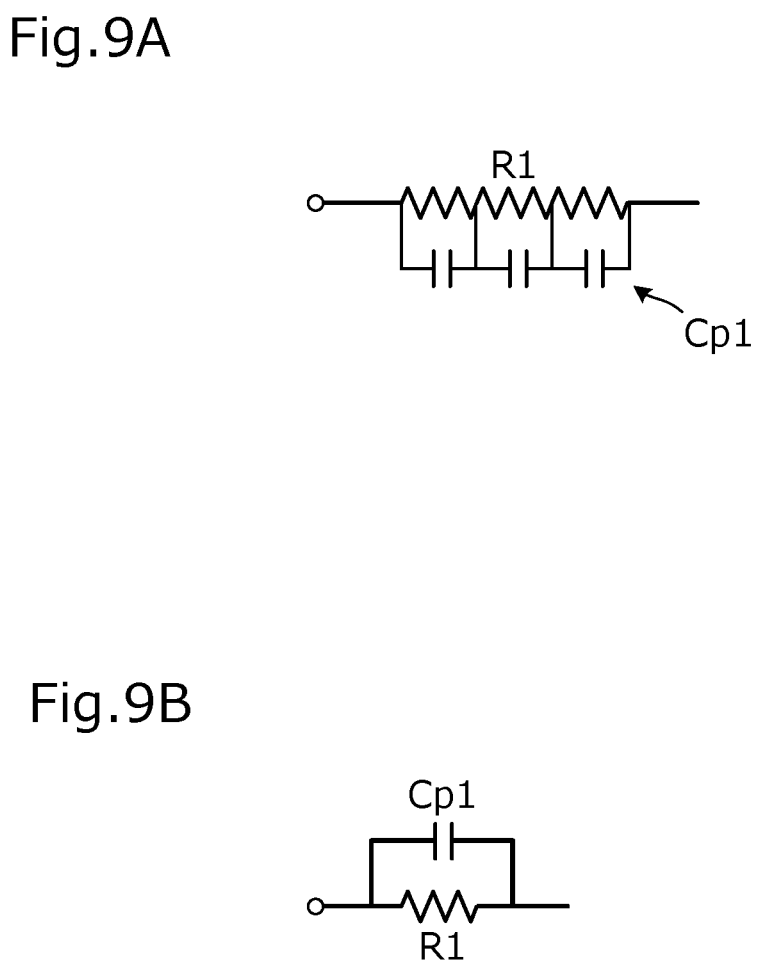

FIG. 9(A) is a diagram showing a circuit including a first resistance component R1 and a first parasitic capacitance component Cp1 of the transient voltage absorption element according to the second exemplary embodiment, and FIG. 9(B) is an equivalent circuit diagram thereof.

Since the electrical conductor Cond2 forming the first resistance component R1 has a bent pattern like a meander line shape, the first parasitic capacitance component Cp1 is formed between the electrical conductors Cond2 in a plane. When the first parasitic capacitance components Cp1 is equivalently represented by a single capacitor, as shown in FIG. 9(B), a circuit in which the first parasitic capacitance component Cp1 is connected in parallel to the first resistance component R1 is obtained. The same applies to a relationship between the second resistance component R2 and the second parasitic capacitance component Cp2.

As shown in the present embodiment, the parasitic capacitance may be a parasitic capacitance generated between portions of the pattern by the resistor or the electrical conductor forming the resistance component.

In the transient voltage absorption element 102 having the structure described in the second embodiment, in order to increase resistance values of the first resistance component R1 and the second resistance component R2, it is effective to lengthen the routing of the pattern of the electrical conductor or to reduce a film thickness of the electrical conductor.

As described above, when the electrical conductor Cond2 as a single layer forms the resistance component, the parasitic capacitance generated between the wiring patterns may be used.

It is noted that in the exemplary aspect described above, although the resistance component includes an electrical conductor, the resistance component may include another resistor or a pattern of an electrical conductor in an alternative exemplary aspect.

Third Exemplary Embodiment

In a third embodiment, an example in which a parasitic capacitance is formed with a structure different from the examples described in the first and second embodiments will be described.

Figure 10:
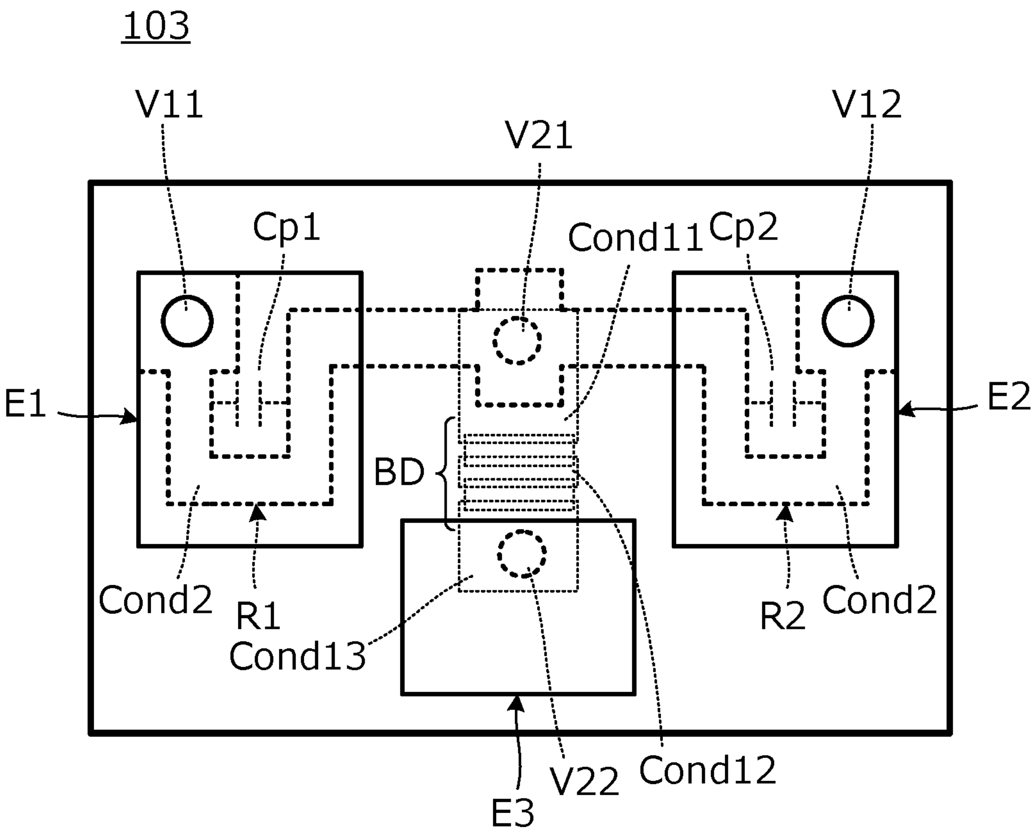
FIG. 10 is a plan view of a transient voltage absorption element 103 according to a third exemplary embodiment.

In particular, FIG. 10 is a plan view of a transient voltage absorption element 103 according to a third exemplary embodiment. Similarly to the example described in the first embodiment, the transient voltage absorption element 103 includes a semiconductor substrate portion and a rewiring portion. A first terminal electrode E1 shown in FIG. 10 corresponds to the first input and output terminal T1 shown in FIG. 1, a second terminal electrode E2 corresponds to the second input and output terminal T2, and a third terminal electrode E3 corresponds to the reference potential connection terminal T3.

According to the exemplary aspect, electrical conductors Cond12 electrically connected to conductors Cond11 and Cond13 are formed in the rewiring portion. The first terminal electrode E1, the second terminal electrode E2, and the third terminal electrode E3 shown in FIG. 10 are the electrical conductors Cond2 and pads Pad of an upper layer of the rewiring portion. In addition, a first resistance component R1 and a second resistance component R2 are formed by the electrical conductors Cond2 of the lower layer of the rewiring portion. The electrical conductor Cond2 of an upper layer and the electrical conductor Cond2 of a lower layer are connected by via conductors V11 and V12. The electrical conductor Cond2 of the lower layer and the electrical conductor Cond11 of the semiconductor substrate portion are connected by a via conductor V21.

As shown in FIG. 10, a diode BD is formed between the electrical conductor Cond11 and the electrical conductor Cond13. Moreover, the electrical conductor Cond13 and the third terminal electrode E3 are connected through a via conductor V22 and a conductor. A configuration of the diode BD is as described above according to the first exemplary embodiment.

Figure 11A:
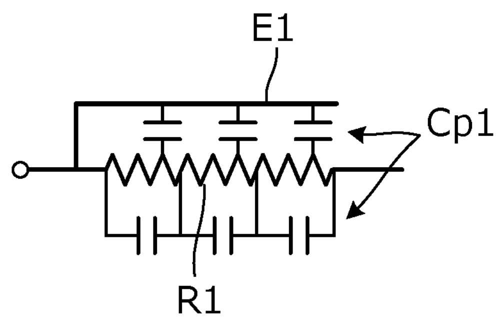
FIG. 11(A) is a diagram showing a circuit including a first resistance component R1 and a first parasitic capacitance component Cp1 of the transient voltage absorption element 103 according to the third exemplary embodiment.
Figure 11B:
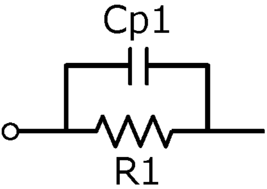
FIG. 11(B) is an equivalent circuit diagram thereof.
Figure 12:
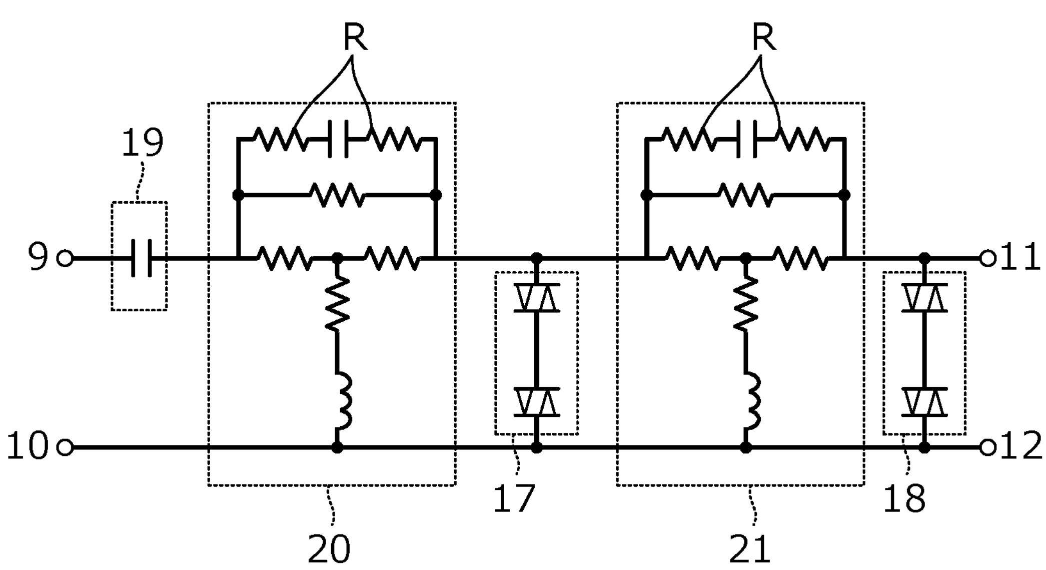
FIG. 12 is a circuit diagram of the repeater surge protection circuit disclosed in Patent Literature 1.

FIG. 11(A) is a diagram showing a circuit including the first resistance component R1 and a first parasitic capacitance component Cp1 of the transient voltage absorption element 103, and FIG. 11(B) is an equivalent circuit diagram thereof.

As shown in FIG. 11(A), the first parasitic capacitance component Cp1 is formed between the electrical conductors Cond2 forming the first resistance component R1. In addition, the first parasitic capacitance component Cp1 is also formed between the electrical conductor Cond2 forming the first resistance component R1 and the first terminal electrode E1. When this parasitic capacitance is equivalently represented by a single capacitor, as shown in FIG. 11(B), a circuit in which the first parasitic capacitance component Cp1 is connected in parallel to the first resistance component R1 is obtained. The same applies to a relationship between the second resistance component R2 and the second parasitic capacitance component Cp2.

In the transient voltage absorption element 103 having the structure described in the third embodiment, in order to increase resistance values of the first resistance component R1 and the second resistance component R2, the routing of the pattern of the electrical conductor Cond2 is lengthened. In addition, a film thickness of the wiring pattern by the electrical conductor Cond2 is reduced and/or a line width of the wiring pattern is reduced, and it is also effective to increase lengths of the via conductors V11 and V12 or to reduce the diameters of the via conductors V11 and V12.

Finally, it is generally noted that the above description of the exemplary embodiments is illustrative in all respects and not restrictive. Modifications and changes can be made as appropriate for those skilled in the art.

For example, in each exemplary embodiment described above, although the transient voltage absorption element connected to the single signal line has been described, a pair of transient voltage absorption elements can be provided on a single base material to form a transient voltage absorption element for a differential signal line according to an exemplary aspect.

In addition, in each embodiment described above, although an exemplary aspect is provided for a surge absorption element including a plurality of diodes, the surge absorption element may include a Zener diode or a thyristor in an alternative exemplary aspect.

The invention claimed is:

1. A transient voltage absorption element for being connected to a signal line in series and connected to a shunt between the signal line and a reference potential, the transient voltage absorption element comprising:

- a base material;
- a first input and output terminal in the base material and connected to the signal line;
- a second input and output terminal in the base material and connected to the signal line;
- a reference potential connection terminal in the base material and connected to the reference potential;
- an internal signal line that electrically connects the first input and output terminal to the second input and output terminal; and
- a surge absorption element connected between the internal signal line and the reference potential connection terminal,
- wherein magnitude of an impedance of a parasitic capacitance component, in a frequency band of a signal propagating through the internal signal line, is smaller than a resistance component of the internal signal line.

2. The transient voltage absorption element according to claim 1, wherein the internal signal line is a wiring pattern of an electrical conductor having a predetermined resistance component in the base material.

3. The transient voltage absorption element according to claim 2, wherein the first input and output terminal is directly connected to the second input and output terminal.

4. The transient voltage absorption element according to claim 3, wherein the internal signal line is formed in one layer, and the parasitic capacitance component is generated on a plane by the wiring pattern.

5. The transient voltage absorption element according to claim 4, wherein the internal signal line comprises a meandering shape.

6. The transient voltage absorption element according to claim 3, wherein the parasitic capacitance component is generated between the internal signal line and at least one of the first input and output terminal and the second input and output terminal.

7. The transient voltage absorption element according to claim 6, wherein:

the base material further includes a dielectric layer, and the internal signal line is disposed at a position that faces at least one of the first input and output terminal and the second input and output terminal with the dielectric layer interposed therebetween.

8. The transient voltage absorption element according to claim 3, wherein the resistance component and the parasitic capacitance component are generated between the first input and output terminal and the reference potential connection terminal, and between the second input and output terminal and the reference potential connection terminal, respectively.

9. The transient voltage absorption element according to claim 8, wherein the wiring pattern of the internal signal line has a symmetrical shape with a surge absorption element as a reference.

10. The transient voltage absorption element according to claim 8, wherein the first input and output terminal and the second input and output terminal are disposed at symmetrical positions with the reference potential connection terminal as a reference.

11. The transient voltage absorption element according to claim 1, wherein:

the resistance component comprises at least one current limiting resistor configured to limit a low-frequency current, and in the internal signal line, the parasitic capacitance component has a lower impedance than the resistance component in a frequency band of the signal propagating through the internal signal line.

12. The transient voltage absorption element according to claim 1, wherein the resistive components are configured by at least one of reducing a film thickness of a wiring pattern, reducing a line width of the wiring pattern, increasing a length of a via conductor, or reducing a diameter of the vias conductor.

13. A transient voltage absorption element for being connected to a signal line in series and connected to a shunt between the signal line and a reference potential, the transient voltage absorption element comprising:

a base material;

a first input and output terminal in the base material and connected to the signal line;

a second input and output terminal in the base material and connected to the signal line;

a reference potential connection terminal in the base material and connected to the reference potential;

an internal signal line that electrically connects the first input and output terminal to the second input and output terminal; and a surge absorption element connected between the internal signal line and the reference potential connection terminal, wherein the internal signal line is a wiring pattern of an electrical conductor having a predetermined resistance component in the base material, wherein a magnitude of an impedance of a parasitic capacitance component, in a frequency band of a signal propagating through the internal signal line, is smaller than a resistance component of the internal signal line, and wherein the base material further includes a dielectric layer, and two or more layers of the internal signal lines are disposed at positions with a dielectric film interposed therebetween.

14. The transient voltage absorption element according to claim 13, wherein the parasitic capacitance component is formed in a region with a dielectric interposed therebetween.

15. A transient voltage absorption element comprising:

a base material;

a first input and output terminal in the base material and configured to connect to a signal line connected in series to the transient voltage absorption element;

a second input and output terminal in the base material and configured to connect to the signal line;

a reference potential connection terminal in the base material and configured to connect to a reference potential;

an internal signal line that electrically connects the first input and output terminal to the second input and output terminal; and a surge absorption element connected between the internal signal line and the reference potential connection terminal, wherein magnitude of an impedance of a parasitic capacitance component, in a frequency band of a signal propagating through the internal signal line, is smaller than a resistance component of the internal signal line.

16. The transient voltage absorption element according to claim 15, wherein the transient voltage absorption element is configured to connect to a shunt between the signal line and the reference potential.

17. The transient voltage absorption element according to claim 15, wherein the internal signal line is a wiring pattern of an electrical conductor having a predetermined resistance component in the base material.

18. The transient voltage absorption element according to claim 17, wherein the first input and output terminal is directly connected to the second input and output terminal.

19. The transient voltage absorption element according to claim 18, wherein the internal signal line is formed in one layer, and the parasitic capacitance component is generated on a plane by the wiring pattern, and wherein the internal signal line comprises a meandering shape.

20. The transient voltage absorption element according to claim 19, wherein:

the parasitic capacitance component is generated between the internal signal line and at least one of the first input and output terminal and the second input and output terminal, the base material further includes a dielectric layer, and the internal signal line is disposed at a position that faces at least one of the first input and output terminal and the second input and output terminal with the dielectric layer interposed therebetween.

* * * * *